US012761917B2

(12) United States Patent
Antinori et al.

(10) Patent No.: US 12,761,917 B2
(45) Date of Patent: *Oct. 13, 2026

(54) AUTOMATIC GENERATION OF EXPORTER CONFIGURATION RULES

(71) Applicant: Red Hat, Inc., Raleigh, NC (US)

(72) Inventors: Paolo Antinori, Novara (IT); Andrea Tarocchi, Seregno (IT)

(73) Assignee: Red Hat, Inc., Raleigh, NC (US)

( * ) Notice: Subject to any disclaimer, the term of this patent is extended or adjusted under 35 U.S.C. 154(b) by 140 days.

This patent is subject to a terminal disclaimer.

(21) Appl. No.: 18/508,535

(22) Filed: Nov. 14, 2023

(65) Prior Publication Data

US 2024/0086191 A1 Mar. 14, 2024

Related U.S. Application Data

(63) Continuation of application No. 17/469,774, filed on Sep. 8, 2021, now Pat. No. 11,847,448.

(51) Int. Cl.

*G06F 9/44* (2018.01)
*G06F 8/71* (2018.01)
*G06F 8/77* (2018.01)
*G06F 11/34* (2006.01)

(52) U.S. Cl.

CPC .................. *G06F 8/77* (2013.01); *G06F 8/71* (2013.01); *G06F 11/3409* (2013.01)

(58) Field of Classification Search

None

See application file for complete search history.

(56) References Cited

U.S. PATENT DOCUMENTS 8,082,553 B2 12/2011 McArdle
10,031,739 B1 * 7/2018 Schindler .............. G06F 16/148
11,720,591 B1 * 8/2023 Zhao ..................... G06F 16/248 707/722
2014/0026121 A1 * 1/2014 Jackson .............. G06F 9/44521 717/124
2016/0080243 A1 * 3/2016 Kodama ................. H04L 43/16 370/252
2016/0350173 A1 12/2016 Ahad
2018/0089328 A1 * 3/2018 Bath ..................... G06F 16/901
2020/0319935 A1 * 10/2020 Srivastava ............ G06F 9/5011

OTHER PUBLICATIONS

Alex Dzyoba, "Configuring JMX exporter for Kafka and Zookeeper", May 2018 (Year: 2018).*

(Continued)

*Primary Examiner* — Lanny N Ung

(74) *Attorney, Agent, or Firm* — Womble Bond Dickinson (US) LLP

(57) ABSTRACT

Systems and methods for detecting an interaction with an application displayed on a user interface to perform a metric exporting function of the application by using an exporter configuration that is inaccessible to a user. The system and method also includes exporting by a processing device executing an exporter, metrics generated by each of the one or more classes of the application to a monitoring program, wherein the exporter uses the exporter configuration to export the metrics generated by each of the one or more classes.

16 Claims, 9 Drawing Sheets

(56) References Cited

OTHER PUBLICATIONS

McCollam, Ronald. "Monitoring Java applications with the Prometheus JMX exporter and Grafana" (Jun. 25, 2020), Grafana Labs Blog / Engineering (https://grafana.com/blog/2020/06/25/monitoring-java-applications-with-the-prometheus-jmx-exporter-and-grafana/), 7 pages.

Sebastian, Toader. "Effortless monitoring of Java applications on Kubernetes" (May 28, 2018), Banzai Cloud Blog (https://banzaicloud.com/blog/prometheus-jmx-exporter-operator/), 12 pages.

* cited by examiner

| | |
|---|---|
| Rules: | |
| pattern: | |
| name: | |
| value: | |
| valueFactor: | |
| labels: | |
| help: | |
| cache: | |
| type: | |
| attrNameSnakeCase: | |

*FIG. 3A*

~~~
rules:
- pattern: 'org.apache.cassandra.metrics<>Value: (\d+)'
name: cassandra_$1_$2
value: $3
valueFactor: 0.001
labels: {}
help: "Cassandra metric $1 $2"
cache: false
type: GAUGE
attrNameSnakeCase: false
```
~~~

*FIG. 3B*

AUTOMATIC GENERATION OF EXPORTER CONFIGURATION RULES

RELATED APPLICATIONS

This application is a continuation of U.S. patent application Ser. No. 17/469,774 filed on Sep. 8, 2021, which is herein incorporated by reference in its entirety.

TECHNICAL FIELD

Aspects of the present disclosure relate to systems monitoring and alerting applications, and more particularly, to automating the generation of configurations for programs that export metrics to systems monitoring and alerting applications.

BACKGROUND

A system monitoring and alerting program such as e.g., the Prometheus™ toolkit can be used to monitor and provide information about environments such as e.g., the Kubernetes™ or Openshift™ platforms. Such systems monitoring and alerting programs may provide a multi-dimensional data model with time series data that is identified by metric name and key/value pairs as well as a flexible query language to leverage this dimensionality. Metrics may refer to numeric measurements, changes to which are recorded over time. The metrics that users wish to measure may be different from application to application. For example, a web server administrator may wish to monitor request times, while a database administrator may wish to monitor the number of active connections or number of active queries etc.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3A is a diagram illustrating an example structure of a set of configuration rules, in accordance with some embodiments of the present disclosure.

FIG. 3B is a diagram illustrating an example set of configuration rules, in accordance with some embodiments of the present disclosure.

DETAILED DESCRIPTION

Figure 1A:
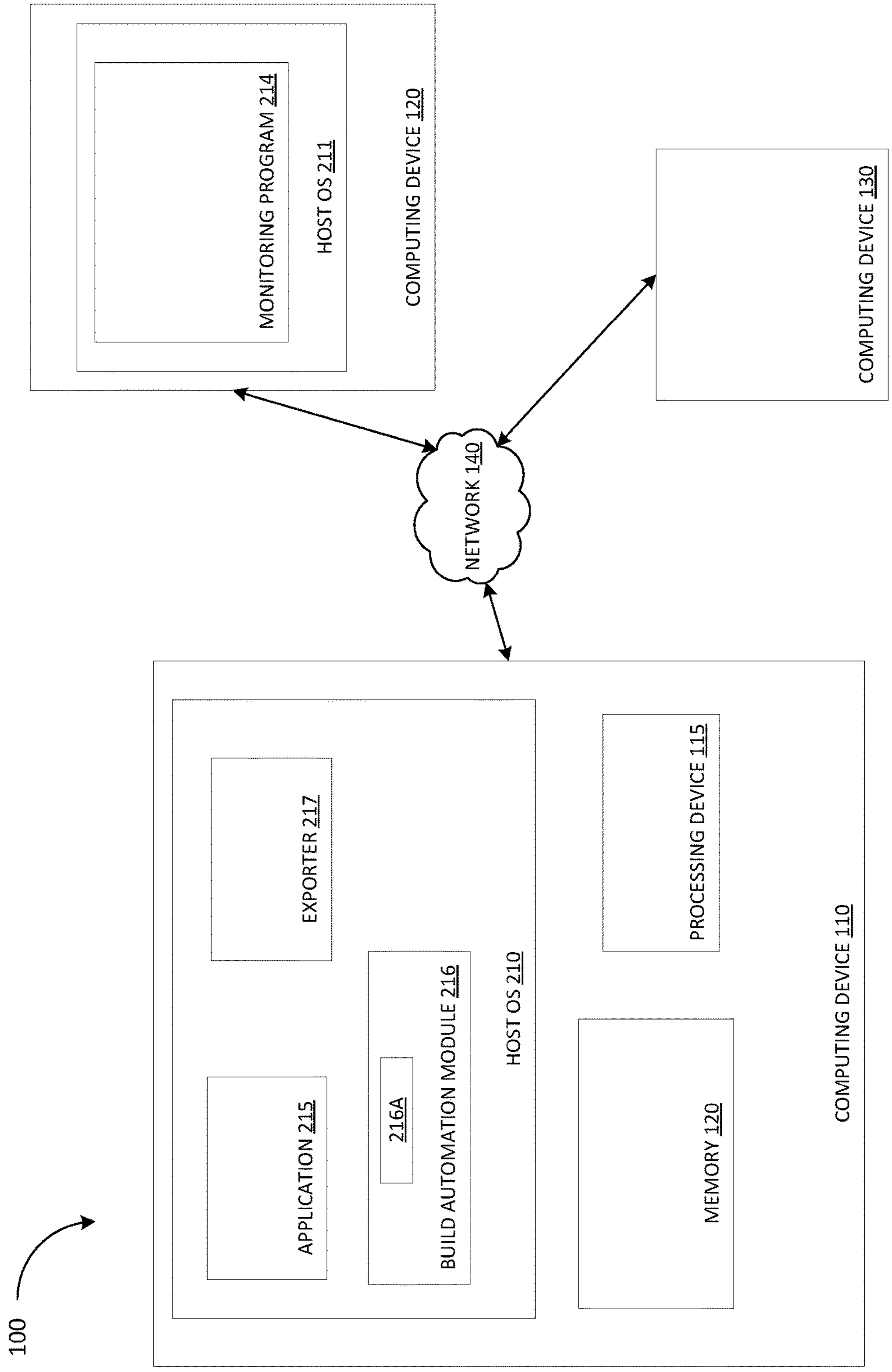
FIG. 1A is a block diagram that illustrates an example system, in accordance with some embodiments of the present disclosure.

In systems that can be instrumented with a systems monitoring and alerting program, the systems monitoring and alerting program may scrape metrics from instrumented jobs, either directly or e.g., via an intermediary push gateway for short-lived jobs. All scraped samples may be stored locally and the systems monitoring and alerting program may run rules over the scraped metrics to either aggregate and record new time series data from existing data and/or generate alerts. Any appropriate API consumer (e.g., Grafana™) can be used to visualize the collected metrics.

However, there are numerous scenarios where it is not feasible to instrument a given system with a systems monitoring and alerting program directly (for example, HAProxy or Linux system statistics). Thus, there are a number of libraries and servers which may assist in exporting existing metrics from third-party systems (e.g., those created by an on-board metric collection program of the third-party system) in the form of metrics of the systems monitoring and alerting program. One example is the Java Management Extensions (JMX) exporter, which connects to Java's native metric collection system, JMX, and can export metrics from a wide variety of Java Virtual Machine (JVM)-based applications such as e.g., Kafka™ and Cassandra™.

The JMX exporter may run as a Java Agent, exposing a HTTP server and serving metrics of a JVM-based application by configurably scraping and exposing managed beans (Mbeans) of a JMX target. It can be also run as an independent HTTP server and scrape remote JMX targets. The JMX exporter also provides a means to configure metrics that a user is exposing by using a configuration file (referred to herein as a configuration). The configuration can also tell the JMX exporter how to transform metrics from the third party system when such metrics are completely non-standard, depending on the usage of the system and the underlying application. The JMX exporter may generate a configuration on its own or may use a configuration provided by a developer to expose third party metrics in a format that is compatible with the systems monitoring and alerting program. However, the configurations generated by the JMX exporter are generic, and configurations must be generated on an application by application basis in order for the JMX exporter to be most effective. However, generating tailored configurations requires waiting for a developer to manually create a configuration. It is difficult for a user to manually create a configuration owing to the lack of understanding of the application.

For example, a user may click around on a user interface (UI) to perform a certain function as part of an application that is running, however the logic that actually performs the function may run behind the scenes. If one of the steps to perform the function involves the use of an exporter, the exporter may assume that a configuration will be provided by the user. However, because the user does not have the capability to generate such a configuration, the application may crash/break down because no configuration has been provided.

The present disclosure addresses the above-noted and other deficiencies by using a processing device to implement a build-time, automatic, exporter configuration rule generator that removes the need for manual definition of exporter configurations. The processing device may perform a scan of source code of an application to identify one or more classes of the application that enable an exporter to access metrics generated by the class. For example, the one or more classes may comprise Mbean classes. For each of the one or more classes, the processing device may analyze the source code of the class with a set of templates and heuristics to generate a set of configuration rules for the class. The set of templates and heuristics may analyze the source code of the class to determine information such as a format of the output of the class, metadata about the class, a scale of any numerical values in the output of the class, and whether the output of the class is static, among other information. This information may be used to populate a rule template, thereby generating a set of configuration rules for the class. The processing device may generate an exporter configuration for the exporter that is specific to the application based on the set of configuration rules for each of the one or more classes.

By automating generation of an application-specific exporter configuration on behalf of a customer at build time in this manner, the usefulness and accuracy of metrics exposed by the exporter are increased (e.g., specifically in the context of JVM applications that use the JMX protocol), while alleviating the user from the burden of having to manually define an application-specific configuration or wait for a developer to define one. In addition, by removing the need for a user to manually define an application-specific configuration, the errors that often accompany manual definition of configurations can be avoided. The techniques described herein are not limited to traditional application development methods, but also can be realized in cloud environments, where people interact with applications via e.g., browsers while the application is generated behind the curtain, without the user having to write any code. By automating the step of creating an export configuration, the entire cloud environment experience can be made more compelling.

FIG. 1A is a block diagram that illustrates an example system 100. As illustrated in FIG. 1A, the system 100 includes computing devices 110, 120, and 130. The computing devices 110, 120, and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between the computing devices 110, 120, and 130. Each computing device 110, 120, and 130 may include hardware such as processing device 115 (e.g., processors, central processing units (CPUs), memory 120 (e.g., random access memory 120 (e.g., RAM), storage devices (e.g., hard-disk drive (HDD), solid-state drive (SSD), etc.)), and other hardware devices (e.g., sound card, video card, etc.). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110.

Each computing device 110, 120, and 130 may comprise any suitable type of computing device or machine that has a programmable processor including, for example, server computers, desktop computers, laptop computers, tablet computers, smartphones, set-top boxes, etc. In some examples, each of the computing devices 110, 120, and 130 may comprise a single machine or may include multiple interconnected machines (e.g., multiple servers configured in a cluster). The computing devices 110, 120, and 130 may be implemented by a common entity/organization or may be implemented by different entities/organizations. For example, computing device 110 may be operated by a first company/corporation and one or more of computing devices 120 and 130 may be operated by a second company/corporation. Each of computing devices 110, 120, and 130 may execute or include an operating system (OS) such as host OS 210 and host OS 211 of computing device 110 and 120 respectively, as discussed in more detail below. The host OS of a computing device 110, 120, and 130 may manage the execution of other components (e.g., software, applications, etc.) and/or may manage access to the hardware (e.g., processors, memory, storage devices etc.) of the computing device.

The host OS 211 may execute a systems monitoring and alerting program (hereinafter referred to as monitoring program 214) which may monitor and provide information about environments such as e.g., an Openshift™ platform running on computing device 110. The host OS 210 may execute application 215, which may be any appropriate JVM-based application such as e.g., Kafka™ or Cassandra™. The computing device 110 may be a system on which metrics in a format of the monitoring program 214 cannot feasibly be instrumented, and thus host OS 210 may also include an exporter 217. The exporter 217 may function to export existing metrics from computing device 110 (e.g., those collected while monitoring application 215) to monitoring program 214 in a format that is native to the monitoring program 214. The embodiments of the present disclosure may be described with respect to a JMX exporter, and thus exporter 217 may be hereinafter referred to as JMX exporter 217. Although the embodiments of the present disclosure are described with reference to a JMX exporter 217 and application 215 being a JVM-based application, this is for ease of description only and the JMX exporter 217 may comprise any appropriate exporter and application 215 may comprise any appropriate application based on any appropriate language.

As discussed above, the configurations generated by the JMX exporter 217 are generic, and configurations must be generated on an application by application basis in order for the JMX exporter 217 to be most effective. However, generating application-specific configurations requires waiting for a developer to manually create the configuration, and it is difficult for a user to create the configuration owing to the lack of understanding of the application 215. Embodiments of the present disclosure provide a build-time, automatic, JMX exporter configuration generator that removes the need for manual definition of exporter configurations by providing techniques for analyzing the code of an application in order to obtain the information required to generate an application-specific exporter configuration.

While a normal Java application includes classes etc., it does not provide a way for remote/external applications to control/interact with them. The Java Managed Extensions (JMX) framework comprises an infrastructure for managing a Java application (or any other resource that needs to be managed) either locally or remotely. The infrastructure may provide objects known as managed beans (Mbeans—hereinafter referred to as Mbean classes) that represent any resource that needs to be managed. An Mbean class can be used for collecting metrics about an application including performance, resource usage, or problems/bugs (in a pull fashion), among other metrics. The JMX framework may provide a JMX agent (not shown), and Mbean classes may be registered with the JMX agent which maintains a registry of MBean classes and provides an interface via which remote applications (e.g., JMX exporter 217) may access them. In this way, remote applications can invoke the specific methods of an Mbean class at any moment, including when the application is running.

Figure 2A:
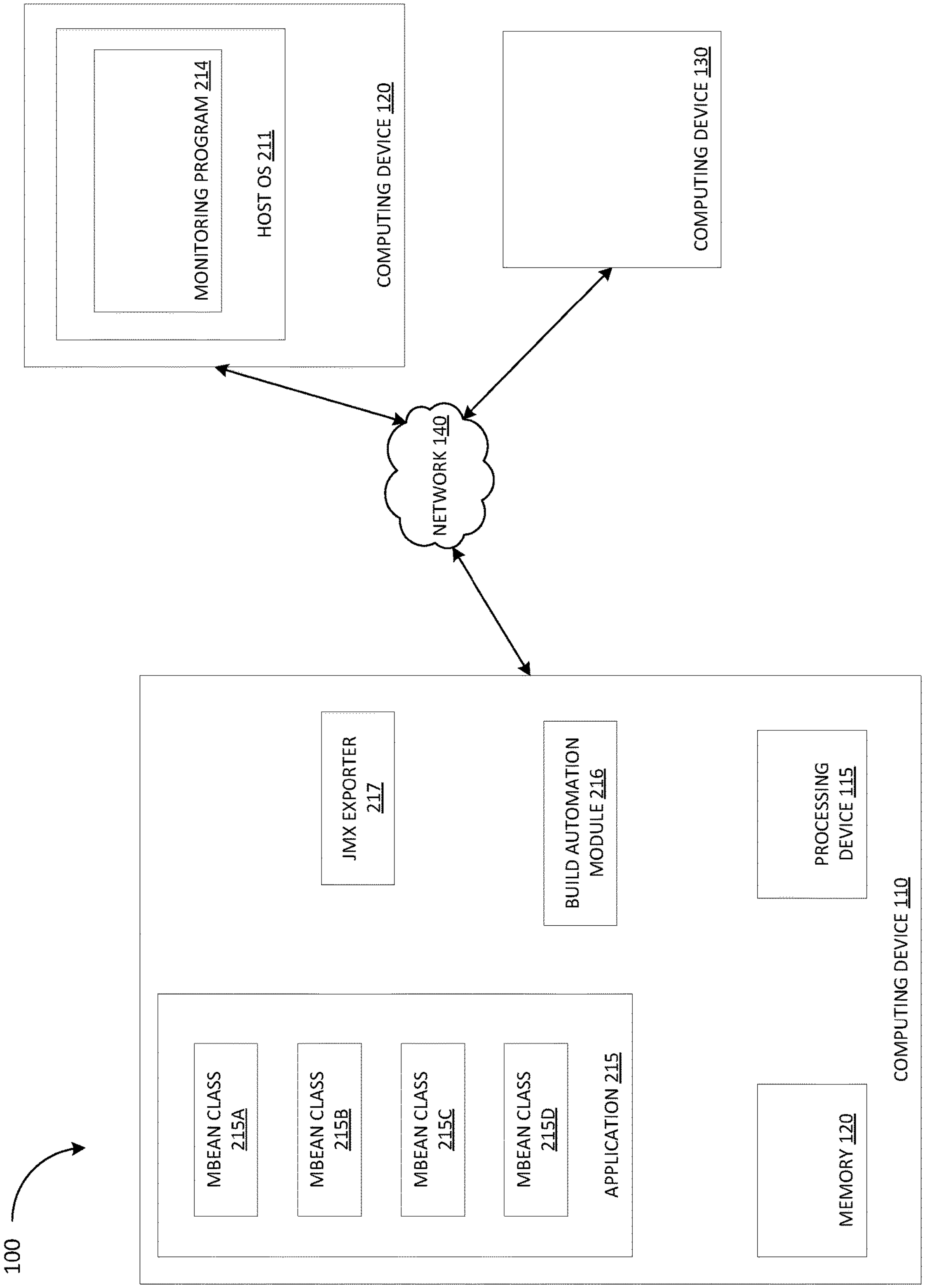
FIG. 2A is a block diagram that illustrates an example system, in accordance with some embodiments of the present disclosure.
Figure 2B:
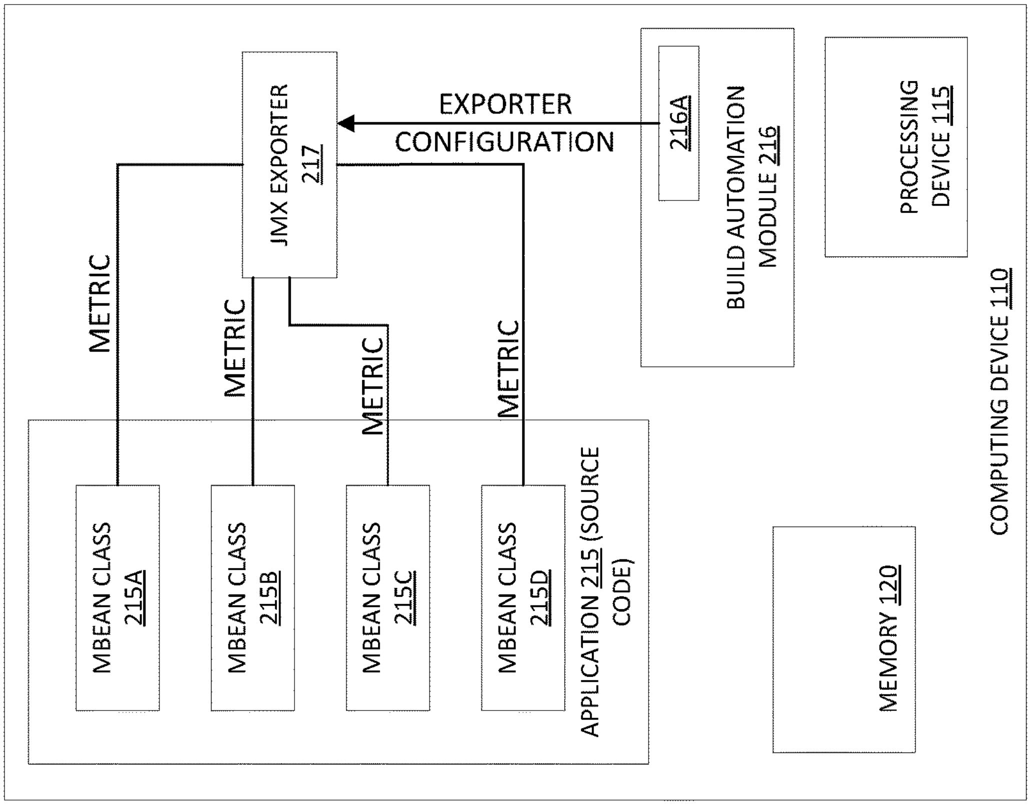
FIG. 2B is a block diagram that illustrates an example computing device, in accordance with some embodiments of the present disclosure.

FIG. 2 illustrates the system 100 and includes a block diagram of the source code of application 215, which may include a set of Mbean classes 215A-215D among other classes (not shown). Each of the Mbean classes 215A-215D may comprise a Java interface (Mbean interface) and a Java class that implements that interface. An MBean interface comprises methods including named and typed attributes that are readable and possibly writable, and named and typed operations that can be invoked by applications that are managed by the MBean class (e.g., JMX exporter 217). The output of the methods of each Mbean class 215A-215D may correspond to a metric(s) to be monitored by the monitoring program 214 and thus each Mbean class 215A-215D may be accessed by the JMX exporter 217.

Figure 1B:
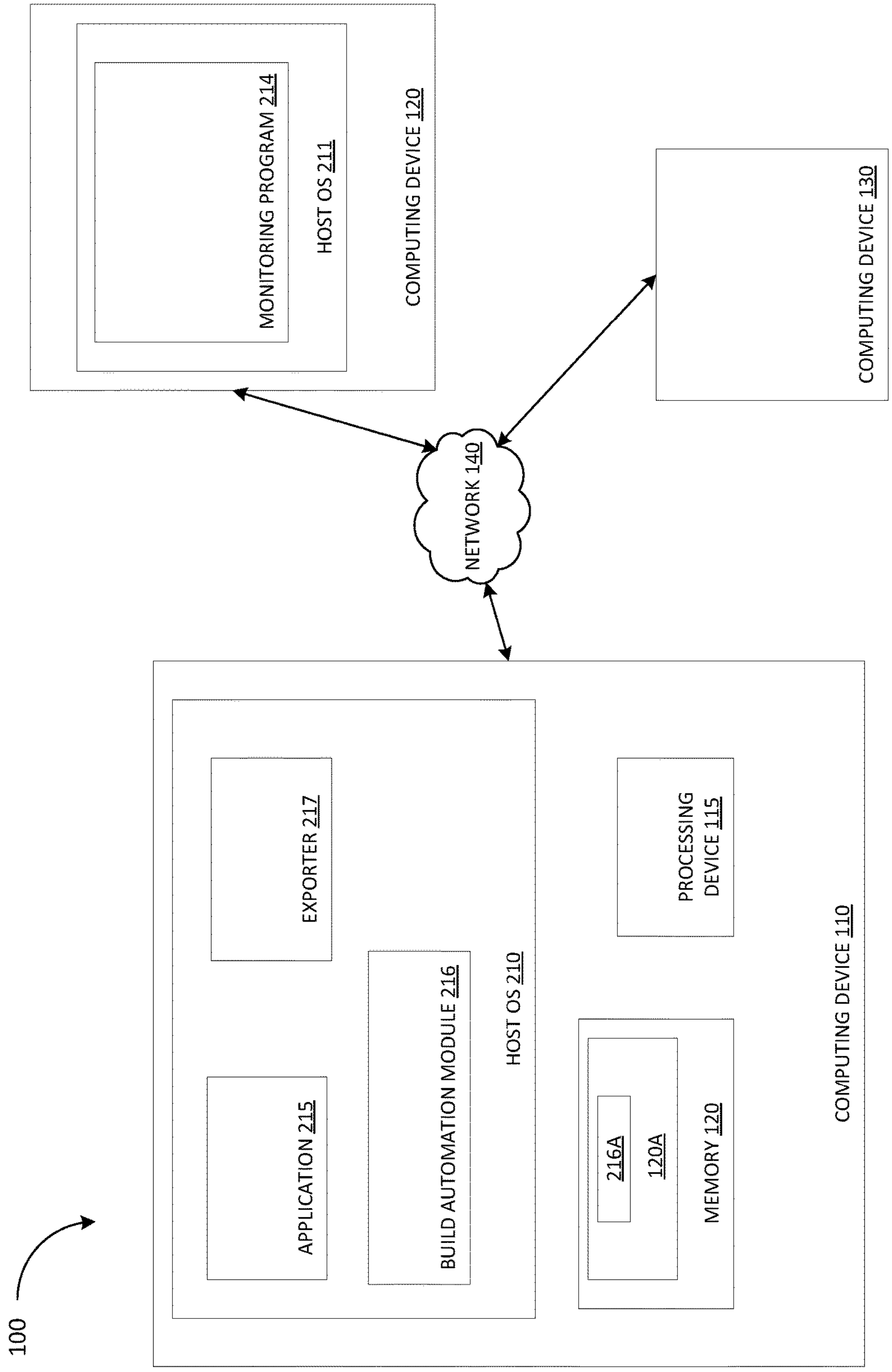
FIG. 1B is a block diagram that illustrates an example system, in accordance with some embodiments of the present disclosure.

In some embodiments, the logic for the functionality described herein may be implemented e.g., at the tooling level, which may comprise a build automation module 216 that may read the source code of application 215 and manipulate it or turn it into a program that the processing device 115 can execute. For example, the build automation module 216 may comprise the Maven build automation tool. In other embodiments (shown in FIG. 1B), the logic for the above functionality may be implemented as an exporter configuration generation module 120A, which may be a software module located within the memory 120. However, for ease of description the embodiments of the present disclosure will be described with respect to the build automation module 216 comprising the logic for the functionality described herein.

Referring also to FIG. 1A, the processing device 115 (executing the build automation module 216) may perform a build time static scan of the source code of the application 215 to automatically identify the Mbean classes 215A-215D of the application 215. As discussed in further detail herein, upon identifying the Mbean classes 215A-215D, the processing device 115 may analyze the code of each Mbean class 215A-215D using a set of templates and heuristics 216A to produce a set of configuration rules that are tailored to that particular Mbean class. The set of configuration rules for each Mbean class may be compiled into a JMX exporter configuration that is specifically tailored for the application 215 and may enable the JMX exporter 217 to provide information corresponding to the metrics to be monitored by the monitoring program 214 in a manner that is more specific and relevant to application 215 than a generic configuration generated at runtime by the JMX exporter 217.

Upon detecting the Mbean classes 215A-215D of application 215 (each Mbean class generating a metric to be exposed), the processing device 115 (executing the build automation module 216) may apply a set of templates and heuristics 216A to the code of each Mbean class 215A-215D to extract information needed to generate a set of configuration rules for each Mbean class 215A-215D that are tailored to that Mbean class.

FIG. 3A illustrates the structure of an example set of configuration rules 300 (shown in FIG. 3B). The structure of the configuration rules 300 may be defined by the JMX exporter 217 and may comprise a set of parameter fields, each of which may be filled with certain information that instructs the JMX exporter 217 on how to present the underlying metrics of an Mbean class. For example, a first parameter field may be the "pattern" parameter field, which may be populated with a regular expression which tells the JMX exporter 217 about the format of an output of an Mbean class, including how to identify/assign a logical name to the metrics generated by the Mbean class among other related information. In the example of FIGS. 3A and 3B, the processing device 115 may be analyzing a first of the detected Mbean classes (Mbean class 215A).

The set of templates and heuristics 216A may include functionality to analyze the source code of the Mbean class 215A and obtain information to generate a regular expression that defines a format of the metrics generated by the Mbean class 215A as well as how to identify/assign a logical name to the metrics generated by the Mbean class 215A. The regular expression may be a generic text based expression that may form a configuration rule that tells the JMX exporter 217 about the format of the metrics generated by the Mbean class 215A, how to identify/assign a logical name to the metrics generated by the Mbean class 215A, and inform the JMX exporter 217 how to read a number if one is detected. The processing device 115 may analyze the source code of the Mbean class 215A and infer the regular expression based on a Java data type detected during the analysis.

For example, the processing device 115 may analyze Mbean class 215A which may state (at the Java level) that the output of its method will be a LONG or INTEGER type. Because these types are numbers without a dot notation, the processing device 115 may determine that a regular expression including \d+ can be used for this configuration rule. /d+ may refer to a decimal digit character which matches any decimal digit, has one or more digits, and includes the standard decimal digits 0-9 as well as the decimal digits of a number of other character sets. Thus, the processing device 115 may populate the pattern parameter field with an expression as shown in FIG. 3B, which illustrates the example set of configuration rules 300 generated from analyzing Mbean class 215A with the set of templates and heuristics 216A.

In another example, if the processing device 115 analyzes Mbean class 215A and determines that the output of its method will be a FLOAT or DOUBLE type, the processing device 115 may determine that the number can be positive or negative, or have a comma, etc. Thus, the processing device 115 may determine that a regular expression including [+−]?([0-9]*[.])?[0-9]+ can be used for this configuration rule. Stated differently, after the processing device 115 determines that the output of some of the Mbean class methods will be a FLOAT or DOUBLE type, the processing device 115 can infer a regular expression (e.g., [+−]?([0-9]*[.])?[0-9]+) that can be used in the generated configuration rule.

As can be seen in FIG. 3A, the structure of the configuration rules 300 may include a "label" parameter field that can be populated with metadata obtained during the analysis of the Mbean class 215A. The set of templates and heuristics 216A may also include functionality to analyze the code of the Mbean class 215A for metadata originating from various metadata sources available in the Mbean class 215A. The metadata may comprise any meaningful information-bearing text such as (e.g., if processing a project from tooling) a name of the project and a description of the project. For example, the processing device 115 may analyze the Mbean class 215A and extract metadata from sources such as the content of a Javadoc of the Mbean class 215A, to the package names of the Mbean class 215A. A Javadoc may comprise application-related documentation that is produced by a markup language that is using Java to produce application-related documentation and can be a source of a large amount of metadata. Upon detecting this metadata, the processing device 115 may update the label parameter field with the metadata.

The structure of the set of configuration rules 300 may include a "valueFactor" parameter field that can be populated with a scaling factor to use in converting a numerical output of the method of Mbean class 215A into a more readable representation. The set of templates and heuristics 216A may include functionality to analyze the code of the Mbean class 215A and determine the best scaling factor to use for translating the value scale of numerical values in the output of the method of Mbean class 215A. If the metric to be exposed has a value scale (e.g., corresponds to a numerical value in) milliseconds, the processing device 115 may determine a value scale appropriate for the JMX exporter 217 and set the valueFactor parameter field to a number that will translate the value scale of the metric to be exposed to the value scale that is appropriate for the JMX exporter 217. For example, the processing device 115 may determine that the appropriate value scale for the JMX exporter 217 is seconds (e.g., because seconds represents a better human readable value scale) and may set the value factor to 1000. In this way, the numerical value of the metric will be translated from milliseconds to seconds.

The structure of the set of configuration rules 300 may include a "cache" parameter field that can be populated with a binary value (e.g., true/false) to indicate whether the monitoring program 214 will update the value of the metric being monitored. The set of templates and heuristics 216A may include functionality to analyze the code of Mbean class 215A and populate the cache parameter field with a value indicating whether the monitoring program 214 will update the value of the metric being monitored. If the cache parameter field is set to true, the monitoring program 214 may not update the value of the metric being monitored. This information may be useful in situations where the information being monitored is known not to change e.g., a person's phone number. In some embodiments, the cache parameter field may be set to true if the expression in the pattern parameter field is not used to match the value of the Mbean class 215A (otherwise it would see only the first value and hide different value until the next cache refresh). Stated differently, the cache parameter of the generated monitoring rule can be set to "true" only for values that are known not to change. Thus, the cache parameters can be automatically set to true only when the "pattern" clause is not used to match the value returned from the Mbean class method because that tends to change over time. If in this case the cache parameter was set to true, only the first value returned from the Mbean class method invocation would be taken into account (until the next cache refresh).

The structure of the set of configuration rules 300 may include a "help" parameter field that can be populated with metadata regarding the Mbean class 215A. The set of templates and heuristics 216A may include functionality to analyze the code of Mbean class 215A to identify the metadata and update the help parameter field with such metadata. The set of templates and heuristics 216A may obtain the metadata by reading from a Javadoc of the application 215, by reading comments in line with the code of the Mbean class 215A, or by using the getmbeaninfo( ) command (when dealing with dynamic Mbeans, and using the output of that command. In some embodiments, the set of templates and heuristics 216A may default to using Javadoc content if present, and then using non Javadoc content (e.g., comments in line with the code) if present.

The structure of the set of configuration rules 300 may include a "type" parameter field that can be populated with a value that is either GUAGE or COUNTER, depending on a type of the information being monitored. The set of templates and heuristics 216A may include functionality to analyze the code of Mbean class 215A and determine whether the type parameter field should be set to either GUAGE or COUNTER. More specifically, when the processing device 115 determines that numbers associated with an output of the Mbean class 215A are always growing, it may set the type parameter field to COUNTER. Whereas when the processing device 115 determines that numbers associated with an output of the Mbean class 215A can move up or down, it may set the type parameter field to GUAGE. In some embodiments, the processing device 115 may infer the type from the name of the getter/setter of the Mbean class 215's output value (e.g., if it contains "sum," "total," "counter" etc.) and if it is determined to be an accumulative value the processing device 115 may set the type parameter field to COUNTER and if not the processing device may set the type parameter field to GUAGE instead.

The structure of the set of configuration rules 300 may include a "attrNameSnakeCase" parameter field that can be populated with a binary value (e.g., true/false) to indicate whether a label of the metrics being exposed is following a convention of lower case and upper case as next word in a sentence that is collapsed into a single word (referred to as snake case). The set of templates and heuristics 216A may include functionality to analyze the code of Mbean class 215A and determine whether the label of the metrics being monitored is following the snake case convention or not. The processing device 115 may determine this by sampling the relevant field in the source code of Mbean 215A to evince the convention used by the project. The processing device 115 may set the "attrNameSnakeCase" parameter field as either true or false indicating whether or not respectively the metrics being exposed follows the snake case convention.

FIG. 3B illustrates the set of configuration rules 300, generated from populating each of the parameter fields with information obtained from analysis of the code of the Mbean class 215A with each of the templates and heuristics 216A. As discussed above, the processing device 115 may perform this analysis and generate a set of configuration rules for each of the Mbean classes 215A-215D, and may combine the set of configuration rules generated for each Mbean class 215A-215D to form an exporter configuration file which the JMX exporter 217 may use to export information corresponding to the metrics to be monitored to the monitoring program 214.

Figure 4:
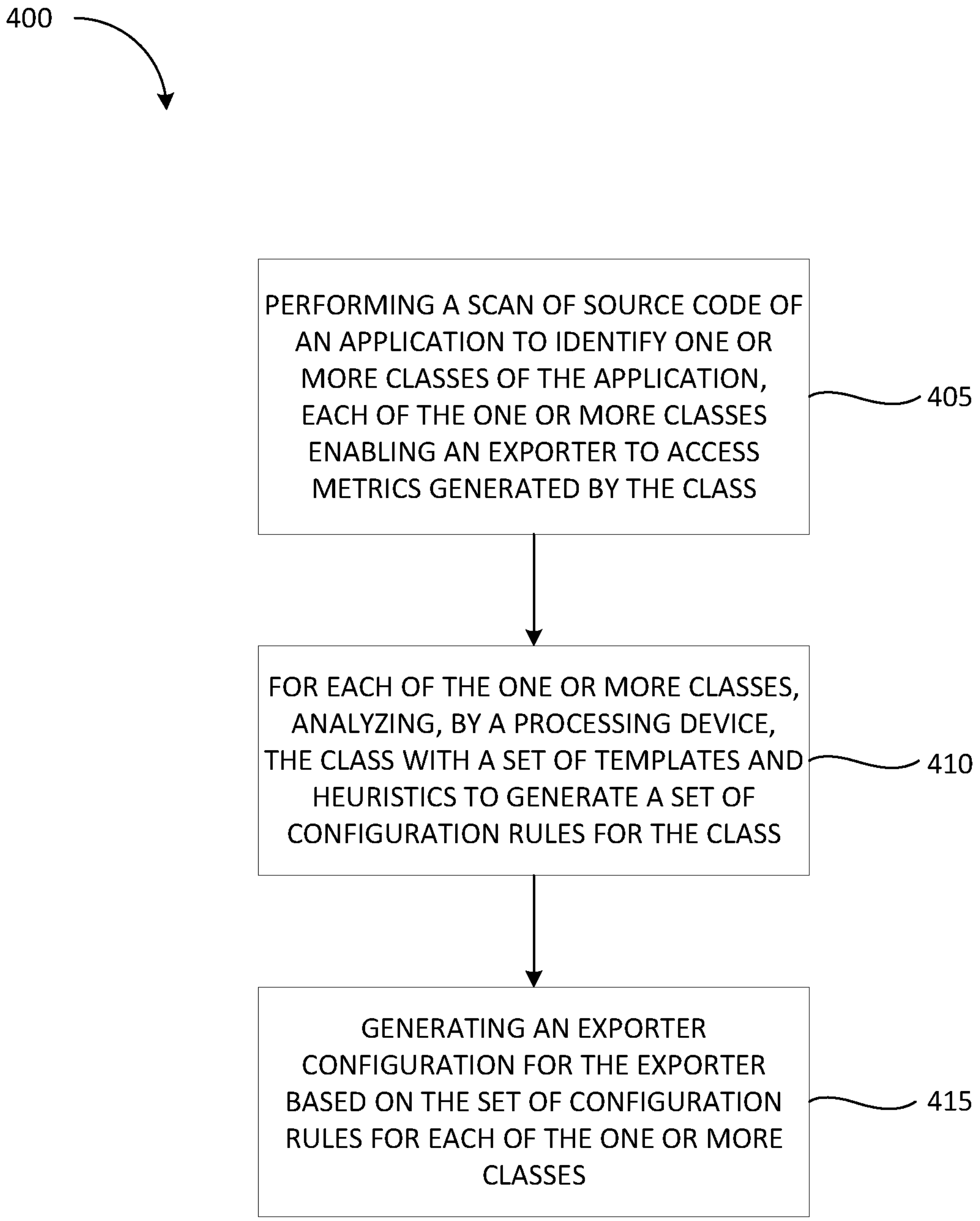
FIG. 4 is a flow diagram of a method for intelligently scheduling a pod, in accordance with some embodiments of the present disclosure.

FIG. 4 is a flow diagram of a method 400 for implementing a build-time, automatic, JMX exporter configuration rule generator that removes the need for manual definition of exporter configurations, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 110 illustrated in FIGS. 1A and 1B).

At block 405, the processing device 115 (executing the build automation module 216) may perform a build time static scan of the source code of the application 215 to automatically identify the Mbean classes 215A-215D of the application 215. At block 410, upon detecting the Mbean classes 215A-215D of application 215 (each Mbean class generating a metric to be exposed), the processing device 115 (executing the build automation module 216) may apply a set of templates and heuristics 216A to the code of each Mbean class 215A-215D to extract information needed to generate a set of configuration rules for each Mbean class 215A-215D that are tailored to that Mbean class.

Figure 5:
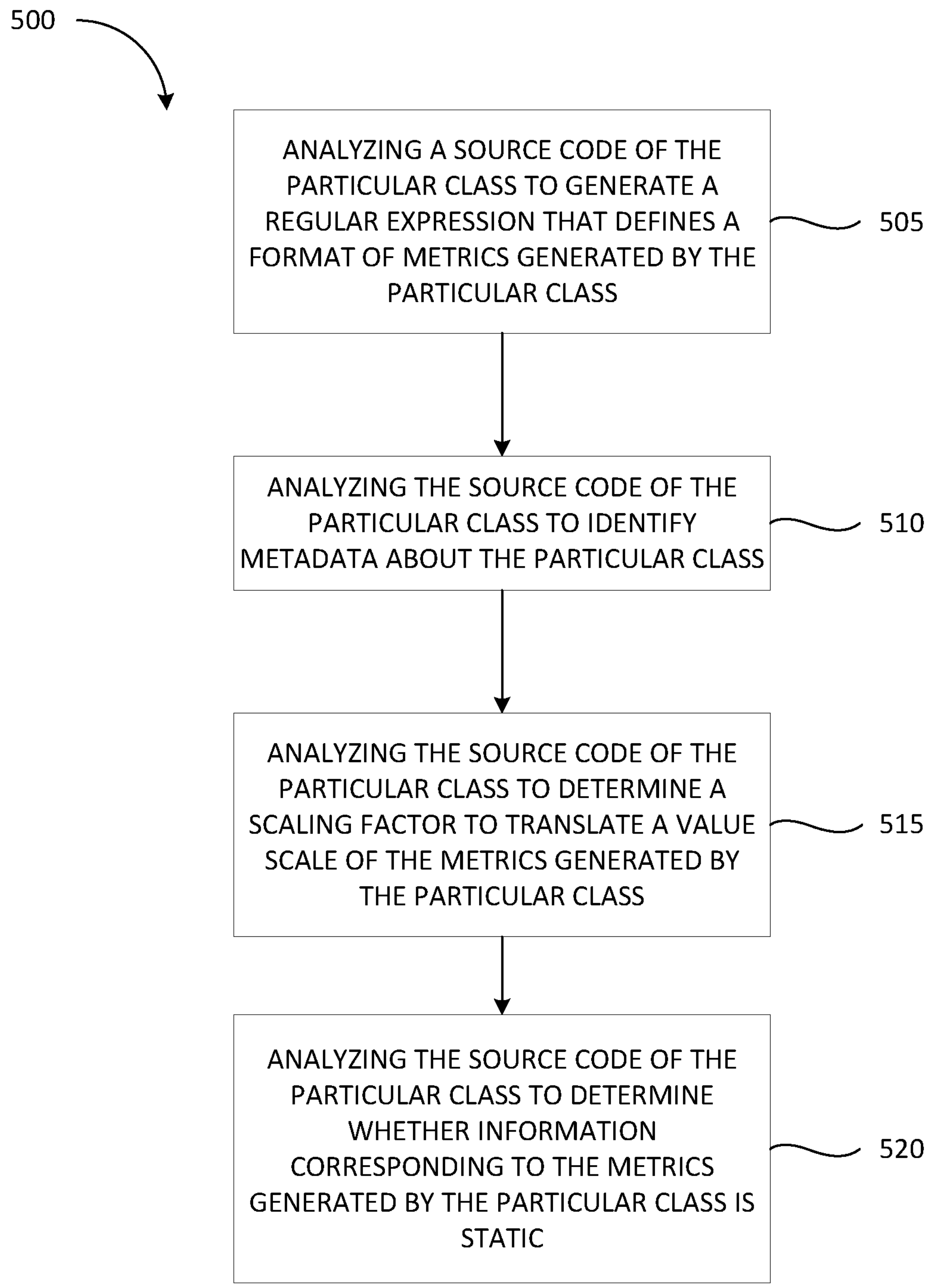
FIG. 5 is a flow diagram of a method for determining a subsequent node on which a pod may be scheduled, in accordance with some embodiments of the present disclosure.

FIG. 5 is a flow diagram of a method 500 for generating a set of configuration rules, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 110 illustrated in FIGS. 1A and 1B).

At block 505, the processing device 115 (executing the set of templates and heuristics 216A) may analyze the source code of the Mbean class 215A and obtain information to generate a regular expression that defines a format of the metrics generated by the Mbean class 215A as well as how to identify/assign a logical name to the metrics generated by the Mbean class 215A. The regular expression may be a generic text based expression that may form a configuration rule that tells the JMX exporter 217 about the format of the metrics generated by the Mbean class 215A, how to identify/assign a logical name to the metrics generated by the Mbean class 215A, and inform the JMX exporter 217 how to read a number if one is detected. The processing device 115 may analyze the source code of the Mbean class 215A and infer the regular expression based on a Java data type detected during the analysis.

For example, the processing device 115 may analyze Mbean class 215A which may state (at the Java level) that the output of its method will be a LONG or INTEGER type. Because these types are numbers without a dot notation, the processing device 115 may determine that a regular expression including \d+ can be used for this configuration rule. /d+ may refer to a decimal digit character which matches any decimal digit, has one or more digits, and includes the standard decimal digits 0-9 as well as the decimal digits of a number of other character sets. Thus, the processing device 115 may populate the pattern parameter field with an expression as shown in FIG. 3B, which illustrates the example set of configuration rules 300 generated from analyzing Mbean class 215A with the set of templates and heuristics 216A.

In another example, if the processing device 115 analyzes Mbean class 215A and determines that the output of its method will be a FLOAT or DOUBLE type, the processing device 115 may determine that the number can be positive or negative, or have a comma, etc. Thus, the processing device 115 may determine that a regular expression including [+−]?([0-9]*[.])?[0-9]+ can be used for this configuration rule.

As can be seen in FIG. 3A, the structure of the configuration rules 300 may include a "label" parameter field that can be populated with metadata obtained during the analysis of the Mbean class 215A. At block 510, the processing device 115 (executing the set of templates and heuristics 216A) may analyze the source code of the Mbean class 215A for metadata originating from various metadata sources available in the Mbean class 215A. The metadata may comprise any meaningful information-bearing text such as (e.g., if processing a project from tooling) a name of the project and a description of the project. For example, the processing device 115 may analyze the Mbean class 215A and extract metadata from sources such as the content of a Javadoc of the Mbean class 215A, to the package names of the Mbean class 215A. A Javadoc may comprise application-related documentation that is produced by a markup language that is using Java to produce application-related documentation and can be a source of a large amount of metadata. Upon detecting this metadata, the processing device 115 may update the label parameter field with the metadata.

The structure of the set of configuration rules 300 may include a "valueFactor" parameter field that can be populated with a scaling factor to use in converting a numerical output of the method of Mbean class 215A into a more readable representation. At block 515, the processing device 115 (executing the set of templates and heuristics 216A) may analyze the code of the Mbean class 215A and determine a scaling factor to use for translating the value scale of numerical values in the output of the method of Mbean class 215A. If the metric to be exposed has a value scale (e.g., corresponds to a numerical value in) milliseconds, the processing device 115 may determine a value scale appropriate for the JMX exporter 217 and set the valueFactor parameter field to a number that will translate the value scale of the metric to be exposed to the value scale that is appropriate for the JMX exporter 217. For example, the processing device 115 may determine that the appropriate value scale for the JMX exporter 217 is seconds (e.g., because seconds represents a better human readable value scale) and may set the value factor to 1000. In this way, the numerical value of the metric will be translated from milliseconds to seconds.

The structure of the set of configuration rules 300 may include a "cache" parameter field that can be populated with a binary value (e.g., true/false) to indicate whether the monitoring program 214 will update the value of the metric being monitored. At block 520, the processing device 115 (executing the set of templates and heuristics 216A) may analyze the code of Mbean class 215A and populate the cache parameter field with a value indicating whether the monitoring program 214 will update the value of the metric being monitored. If the cache parameter field is set to true, the monitoring program 214 may not update the value of the metric being monitored. This information may be useful in situations where the information being monitored is known not to change e.g., a person's phone number. In some embodiments, the cache parameter field may be set to true if the expression in the pattern parameter field is not used to match the value of the Mbean class 215A (otherwise it would see only the first value and hide different value until the next cache refresh).

The structure of the set of configuration rules 300 may include a "help" parameter field that can be populated with metadata regarding the Mbean class 215A. The processing device 115 (executing the set of templates and heuristics 216A) may analyze analyze the code of Mbean class 215A to identify the metadata and update the help parameter field with such metadata. The set of templates and heuristics 216A may obtain the metadata by reading from a Javadoc of the application 215, by reading comments in line with the code of the Mbean class 215A, or by using the getmbeaninfo( ) command (when dealing with dynamic Mbeans, and using the output of that command. In some embodiments, the set of templates and heuristics 216A may default to using Javadoc content if present, and then using non Javadoc content (e.g., comments in line with the code) if present.

The structure of the set of configuration rules 300 may include a "type" parameter field that can be populated with a value that is either GUAGE or COUNTER, depending on a type of the information being monitored. The set of templates and heuristics 216A may include functionality to analyze the code of Mbean class 215A and determine whether the type parameter field should be set to either GUAGE or COUNTER. More specifically, when the processing device 115 determines that numbers associated with an output of the Mbean class 215A are always growing, it may set the type parameter field to COUNTER. Whereas when the processing device 115 determines that numbers associated with an output of the Mbean class 215A can move up or down, it may set the type parameter field to GUAGE. In some embodiments, the processing device 115 may infer the type from the name of the getter/setter of the Mbean class 215's output value (e.g., if it contains "sum," "total," "counter" etc.) and if it is determined to be an accumulative value the processing device 115 may set the type parameter field to COUNTER and if not the processing device may set the type parameter field to GUAGE instead.

The structure of the set of configuration rules 300 may include a "attrNameSnakeCase" parameter field that can be populated with a binary value (e.g., true/false) to indicate whether a label of the metrics being exposed is following a convention of lower case and upper case as next word in a sentence that is collapsed into a single word (referred to as snake case). The set of templates and heuristics 216A may include functionality to analyze the code of Mbean class 215A and determine whether the label of the metrics being monitored is following the snake case convention or not. The processing device 115 may determine this by sampling the relevant field in the source code of Mbean 215A to evince the convention used by the project. The processing device 115 may set the "attrNameSnakeCase" parameter field as either true or false indicating whether or not respectively the metrics being exposed follows the snake case convention.

FIG. 3B illustrates the set of configuration rules 300, generated from populating each of the parameter fields with information obtained from analysis of the code of the Mbean class 215A with each of the templates and heuristics 216A. As discussed above, the processing device 115 may perform this analysis and generate a set of configuration rules for each of the Mbean classes 215A-215D.

Referring back to FIG. 4, at block 415, the processing device 115 may combine the set of configuration rules generated for each Mbean class 215A-215D to form an exporter configuration file which the JMX exporter 217 may use to export information corresponding to the metrics to be monitored to the monitoring program 214.

Figure 6:
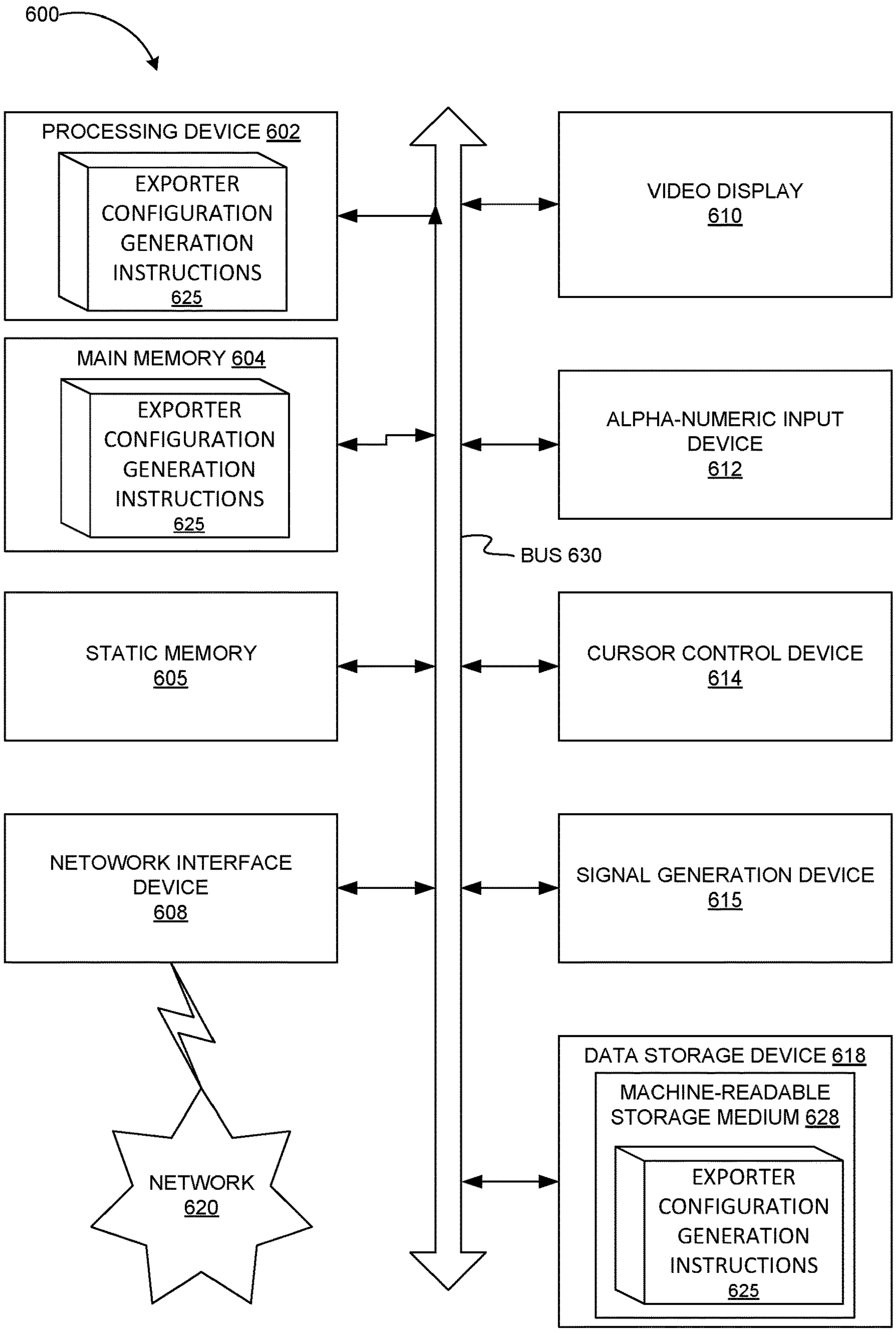
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for implementing a build-time, automatic, exporter configuration rule generator that removes the need for manual definition of exporter configurations.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute exporter configuration generation instructions 625, for performing the operations and steps discussed herein.

The data storage device 618 may include a machine-readable storage medium 628, on which is stored one or more sets of exporter configuration generation instructions 625 (e.g., software) embodying any one or more of the methodologies of functions described herein. The exporter configuration generation instructions 625 may also reside, completely or at least partially, within the main memory 604 or within the processing device 602 during execution thereof by the computer system 600; the main memory 604 and the processing device 602 also constituting machine-readable storage media. The exporter configuration generation instructions 625 may further be transmitted or received over a network 620 via the network interface device 608.

The machine-readable storage medium 628 may also be used to store instructions to perform a method for determining if a controller that can service a CRD exists, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Example 1 is a method comprising: performing a scan of source code of an application to identify one or more classes of the application, each of the one or more classes enabling an exporter to access metrics generated by the class; for each of the one or more classes, analyzing, by a processing device, the class with a set of templates and heuristics to generate a set of configuration rules for the class; and generating an exporter configuration for the exporter based on the set of configuration rules for each of the one or more classes.

Example 2 is the method of example 1, further comprising: exporting by the exporter, the metrics generated by each of the one or more classes to a monitoring program, wherein the exporter uses the exporter configuration to export the metrics generated by each of the one or more classes.

Example 3 is the method of example 1, wherein analyzing a particular class of the one or more classes with the set of templates and heuristics comprises: analyzing a source code of the particular class to generate a regular expression that defines a format of metrics generated by the particular class; and analyzing the source code of the particular class to identify metadata about the particular class.

Example 4 is the method of example 3, wherein analyzing the particular class with the set of templates and heuristics further comprises: analyzing the source code of the particular class to determine a scaling factor to translate a value scale of the metrics generated by the particular class; and analyzing the source code of the particular class to determine whether information corresponding to the metrics generated by the particular class is static.

Example 5 is the method of example 4, wherein a set of configuration rules for the particular class comprises: the regular expression that defines the format of the metrics generated by the particular class; the metadata about the particular class; the scaling factor; and an indication of whether a monitoring program caches the information corresponding to the metrics generated by the particular class, wherein the indication is based on the determination of whether the information corresponding to the metrics generated by the particular class is static.

Example 6 is the method of example 1, wherein the exporter is a Java Management Extension (JMX) exporter and the application is a Java Virtual Machine (JVM) application.

Example 7 is the method of example 1, wherein the scan of the source code is a static scan performed at build time.

Example 8 is a system comprising: a memory; and a processing device operatively coupled to the memory, the processing device to: perform a scan of source code of an application to identify one or more classes of the application, each of the one or more classes enabling an exporter to access metrics generated by the class; for each of the one or more classes, analyze the class with a set of templates and heuristics to generate a set of configuration rules for the class; and generate an exporter configuration for the exporter based on the set of configuration rules for each of the one or more classes.

Example 9 is the system of example 8, wherein the processing device is further to: export by the exporter, the metrics generated by each of the one or more classes to a monitoring program, wherein the exporter uses the exporter configuration to export the metrics generated by each of the one or more classes.

Example 10 is the system of example 8, wherein to analyze a particular class of the one or more classes with the set of templates and heuristics, the processing device is to: analyze a source code of the particular class to generate a regular expression that defines a format of metrics generated by the particular class; and analyze the source code of the particular class to identify metadata about the particular class.

Example 11 is the system of example 10, wherein to analyze the particular class with the set of templates and heuristics, the processing device is further to: analyze the source code of the particular class to determine a scaling factor to translate a value scale of the metrics generated by the particular class; and analyze the source code of the particular class to determine whether information corresponding to the metrics generated by the particular class is static.

Example 12 is the system of example 11, wherein a set of configuration rules for the particular class comprises: the regular expression that defines the format of the metrics generated by the particular class; the metadata about the particular class; the scaling factor; and an indication of whether a monitoring program caches the information corresponding to the metrics generated by the particular class, wherein the indication is based on the determination of whether the information corresponding to the metrics generated by the particular class is static.

Example 13 is the system of example 8, wherein the exporter is a Java Management Extension (JMX) exporter and the application is a Java Virtual Machine (JVM) application.

Example 14 is the system of example 8, wherein to perform the scan of the source code, the processing device performs a static scan of the source code at build-time.

Example 15 is a non-transitory computer readable medium having instructions stored thereon which, when executed by a processing device, cause the processing device to: perform a scan of source code of an application to identify one or more classes of the application, each of the one or more classes enabling an exporter to access metrics generated by the class; for each of the one or more classes, analyze the class with a set of templates and heuristics to generate a set of configuration rules for the class; and generate an exporter configuration for the exporter based on the set of configuration rules for each of the one or more classes.

Example 16 is the non-transitory computer readable medium of example 15, wherein the processing device is further to: export by the exporter, the metrics generated by each of the one or more classes to a monitoring program, wherein the exporter uses the exporter configuration to export the metrics generated by each of the one or more classes.

Example 17 is the non-transitory computer readable medium of example 15, wherein to analyze a particular class of the one or more classes with the set of templates and heuristics, the processing device is to: analyze a source code of the particular class to generate a regular expression that defines a format of metrics generated by the particular class; and analyze the source code of the particular class to identify metadata about the particular class.

Example 18 is the non-transitory computer readable medium of example 17, wherein to analyze the particular class with the set of templates and heuristics, the processing device is further to: analyze the source code of the particular class to determine a scaling factor to translate a value scale of the metrics generated by the particular class; and analyze the source code of the particular class to determine whether information corresponding to the metrics generated by the particular class is static.

Example 19 is the non-transitory computer readable medium of example 18, wherein a set of configuration rules for the particular class comprises: the regular expression that defines the format of the metrics generated by the particular class; the metadata about the particular class; the scaling factor; and an indication of whether a monitoring program caches the information corresponding to the metrics generated by the particular class, wherein the indication is based on the determination of whether the information corresponding to the metrics generated by the particular class is static.

Example 20 is the non-transitory computer readable medium of example 15, wherein the exporter is a Java Management Extension (JMX) exporter and the application is a Java Virtual Machine (JVM) application.

Example 21 is the non-transitory computer readable medium of example 15, wherein to perform the scan of the source code, the processing device performs a static scan of the source code at build-time.

Example 22 is a method comprising: identifying one or more managed bean (Mbean) classes of an application, each of the one or more Mbean classes enabling a Java Management Extension (JMX) exporter to access metrics generated by the Mbean class; for each of the one or more Mbean classes: analyze, by a processing device, the Mbean class with a set of templates and heuristics to obtain information about the Mbean class; and populate an exporter configuration structure with the information about the Mbean class to generate a set of configuration rules for each of the one or more Mbean classes; and generate an exporter configuration for the JMX exporter based on the set of configuration rules for each of the one or more Mbean classes.

Example 23 is the method of example 22, further comprising: exporting by the JMX exporter, the metrics generated by each of the one or more Mbean classes to a monitoring program, wherein the JMX exporter uses the exporter configuration to export the metrics generated by each of the one or more Mbean classes.

Example 24 is the method of example 22, wherein analyzing a particular Mbean class of the one or more Mbean classes with the set of templates and heuristics comprises: analyzing a source code of the particular Mbean class to generate a regular expression that defines a format of metrics generated by the particular Mbean class; and analyzing the source code of the particular Mbean class to identify metadata about the particular Mbean class.

Example 25 is the method of example 24, wherein analyzing the particular Mbean class with the set of templates and heuristics further comprises: analyzing the source code of the particular Mbean class to determine a scaling factor to translate a value scale of the metrics generated by the particular Mbean class; and analyzing the source code of the particular Mbean class to determine whether information corresponding to the metrics generated by the particular Mbean class is static.

Example 26 is the method of example 25, wherein the information about the particular Mbean class comprises: the regular expression that defines the format of the metrics generated by the particular Mbean class; the metadata about the particular Mbean class; the scaling factor; and an indication of whether a monitoring program caches the information corresponding to the metrics generated by the particular Mbean class, wherein the indication is based on the determination of whether information corresponding to the metrics generated by the particular Mbean class is static.

Example 27 is the method of example 22, wherein the processing device performs the scan of the source code as a static scan at build time.

Example 28 is a non-transitory computer-readable medium having instructions stored thereon which, when executed by a processing device, cause the processing device to: identify one or more managed bean (Mbean) classes of an application, each of the one or more Mbean classes enabling a Java Management Extension (JMX) exporter to access metrics generated by the Mbean class; for each of the one or more Mbean classes; analyze, by a processing device, the Mbean class with a set of templates and heuristics to obtain information about the Mbean class; and populate an exporter configuration structure with the information about the Mbean class to generate a set of configuration rules for each of the one or more Mbean classes; and generate an exporter configuration for the JMX exporter based on the set of configuration rules for each of the one or more Mbean classes.

Example 29 is the non-transitory computer-readable medium of example 28, wherein the processing device is further to: export by the JMX exporter, the metrics generated by each of the one or more Mbean classes to a monitoring program, wherein the JMX exporter uses the exporter configuration to export the metrics generated by each of the one or more Mbean classes.

Example 30 is the non-transitory computer-readable medium of example 28, wherein to analyze a particular Mbean class of the one or more Mbean classes with the set of templates and heuristics, the processing device is to: analyze a source code of the particular Mbean class to generate a regular expression that defines a format of metrics generated by the particular Mbean class; and analyze the source code of the particular Mbean class to identify metadata about the particular Mbean class.

Example 31 is the non-transitory computer-readable medium of example 30, wherein to analyze the particular Mbean class with the set of templates and heuristics, the processing device is further to: analyze the source code of the particular Mbean class to determine a scaling factor to translate a value scale of the metrics generated by the particular Mbean class; and analyze the source code of the particular Mbean class to determine whether information corresponding to the metrics generated by the particular Mbean class is static.

Example 32 is the non-transitory computer-readable medium of example 31, wherein the information about the particular Mbean class comprises: the regular expression that defines the format of the metrics generated by the particular Mbean class; the metadata about the particular Mbean class; the scaling factor; and an indication of whether a monitoring program caches the information corresponding to the metrics generated by the particular Mbean class, wherein the indication is based on the determination of whether information corresponding to the metrics generated by the particular Mbean class is static.

Example 33 is the non-transitory computer-readable medium of example 28, wherein the processing device performs the scan of the source code as a static scan at build time.

Example 34 is a system comprising: means for performing a scan of source code of an application to identify one or more classes of the application, each of the one or more classes enabling an exporter to access metrics generated by the class; means for: for each of the one or more classes, analyzing, by a processing device, the class with a set of templates and heuristics to generate a set of configuration rules for the class; and means for generating an exporter configuration for the exporter based on the set of configuration rules for each of the one or more classes.

Example 35 is the system of example 34, further comprising means for exporting by the exporter, the metrics generated by each of the one or more classes to a monitoring program, wherein the exporter uses the exporter configuration to export the metrics generated by each of the one or more classes.

Example 36 is the system of example 34, wherein the means for analyzing a particular class of the one or more classes with the set of templates and heuristics comprises: means for analyzing a source code of the particular class to generate a regular expression that defines a format of metrics generated by the particular class; and means for analyzing the source code of the particular class to identify metadata about the particular class.

Example 37 is the system of example 36, wherein the means for analyzing the particular class with the set of templates and heuristics further comprises: means for analyzing the source code of the particular class to determine a scaling factor to translate a value scale of the metrics generated by the particular class; and means for analyzing the source code of the particular class to determine whether information corresponding to the metrics generated by the particular class is static.

Example 38 is the method of example 37, wherein a set of configuration rules for the particular class comprises: the regular expression that defines the format of the metrics generated by the particular class; the metadata about the particular class; the scaling factor; and an indication of whether a monitoring program caches the information corresponding to the metrics generated by the particular class, wherein the indication is based on the determination of whether the information corresponding to the metrics generated by the particular class is static.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

detecting an interaction with an application displayed on a user interface to perform a metric exporting function of the application by using an exporter configuration for an exporter, the exporter configuration being inaccessible to a user and including instructions that inform the exporter how to read a numerical value generated by a class of the application, wherein the instructions include a regular expression that matches a textual representation of the numerical value and the regular expression is selected based on a data type of the numerical value indicated in source code of the class;

performing a scan of source code of the application to identify one or more classes of the application, each of the one or more classes enabling the exporter to access metrics generated by the class;

generating the exporter configuration for the exporter based on a set of configuration rules for each of the one or more classes to prevent a crash of the application responsive to the interaction with the application; and exporting by a processing device executing the exporter, the metrics generated by each of the one or more classes of the application to a monitoring program, wherein the exporter uses the exporter configuration to export the metrics generated by each of the one or more classes.

2. The method of claim 1, further comprising:

for each of the one or more classes, analyzing a source code of the class with a set of templates and heuristics to generate a set of configuration rules for the class, wherein the set of configuration rules for each of the one or more classes include:

a format of the metrics generated by the class; and metadata about the class.

3. The method of claim 2, wherein the set of configuration rules for each of the one or more classes further include:

a scaling factor to translate a value scale of the metrics generated by the class; and a determination of whether information corresponding to the metrics generated by the class is static.

4. The method of claim 3, wherein the set of configuration rules for each of the one or more classes further include:

an indication of whether a monitoring program caches the information corresponding to the metrics generated by the class, wherein the indication is based on the determination of whether the information corresponding to the metrics generated by the class is static.

5. The method of claim 1, wherein the exporter is a Java Management Extension (JMX) exporter and the application is a Java Virtual Machine (JVM) application.

6. The method of claim 1, wherein the scan of the source code is a static scan performed at build time.

7. A system comprising:

a memory; and a processing device operatively coupled to the memory, the processing device to:

detect an interaction with an application displayed on a user interface to perform a metric exporting function of the application by using an exporter configuration for an exporter, the exporter configuration being inaccessible to a user and including instructions that inform the exporter how to read a numerical value generated by a class of the application, wherein the instructions include a regular expression that matches a textual representation of the numerical value and the regular expression is selected based on a data type of the numerical value indicated in source code of the class;

perform a scan of source code of the application to identify one or more classes of the application, each of the one or more classes enabling the exporter to access metrics generated by the class;

generate the exporter configuration for the exporter based on a set of configuration rules for each of the one or more classes to prevent a crash of the application responsive to the interaction with the application; and export, by the exporter executed by the processing device, the metrics generated by each of the one or more classes of the application to a monitoring program, wherein the exporter uses the exporter configuration to export the metrics generated by each of the one or more classes.

8. The system of claim 7, wherein the processing device further to, for each of the one or more classes, analyze a source code of the class with a set of templates and heuristics to generate a set of configuration rules for the class, wherein the set of configuration rules for each of the one or more classes include:

a format of the metrics generated by the class; and metadata about the class.

9. The system of claim 8, wherein the set of configuration rules for each of the one or more classes further include:

a scaling factor to translate a value scale of the metrics generated by the particular class; and a determination of whether information corresponding to the metrics generated by the particular class is static.

10. The system of claim 9, wherein the set of configuration rules for each of the one or more classes further include:

an indication of whether a monitoring program caches the information corresponding to the metrics generated by the class, wherein the indication is based on the determination of whether the information corresponding to the metrics generated by the class is static.

11. The system of claim 7, wherein the exporter is a Java Management Extension (JMX) exporter and the application is a Java Virtual Machine (JVM) application.

12. The system of claim 7, wherein to perform the scan of the source code, the processing device performs a static scan of the source code at build-time.

13. A non-transitory computer-readable medium having instructions stored thereon which, when executed by a processing device, cause the processing device to:

detect an interaction with an application displayed on a user interface to perform a metric exporting function of the application by using an exporter configuration for an exporter, the exporter configuration being inaccessible to a user and including instructions that inform the exporter how to read a numerical value generated by a class of the application, wherein the instructions include a regular expression that matches a textual representation of the numerical value and the regular expression is selected based on a data type of the numerical value indicated in source code of the class;

perform a scan of source code of the application to identify one or more classes of the application, each of the one or more classes enabling the exporter to access metrics generated by the class;

generate the exporter configuration for the exporter based on a set of configuration rules for each of the one or more classes to prevent a crash of the application responsive to the interaction with the application; and export, by the exporter executed by the processing device, the metrics generated by each of the one or more classes of the application to a monitoring program, wherein the exporter uses the exporter configuration to export the metrics generated by each of the one or more classes.

14. The non-transitory computer-readable medium of claim 13, wherein the processing device further to, for each of the one or more classes, analyze a source code of the class with a set of templates and heuristics to generate a set of configuration rules for the class, wherein the set of configuration rules for each of the one or more classes include:

a format of the metrics generated by the class; and metadata about the class.

15. The non-transitory computer-readable medium of claim 13, wherein the exporter is a Java Management Extension (JMX) exporter and the application is a Java Virtual Machine (JVM) application.

16. The non-transitory computer-readable medium of claim 13, wherein the processing device performs a scan of the source code as a static scan at build time.

* * * * *